United States Patent
Lockwood et al.

(10) Patent No.: US 8,893,828 B2
(45) Date of Patent: Nov. 25, 2014

(54) HIGH STRENGTH INFILTRATED MATRIX BODY USING FINE GRAIN DISPERSIONS

(75) Inventors: Gregory T. Lockwood, Pearland, TX (US); Madapusi K. Keshavan, The Woodlands, TX (US); Anthony Griffo, The Woodlands, TX (US)

(73) Assignee: Smith International, Inc., Houston, TX (US)

( * ) Notice: Subject to any disclaimer, the term of this patent is extended or adjusted under 35 U.S.C. 154(b) by 659 days.

(21) Appl. No.: 12/949,290

(22) Filed: Nov. 18, 2010

(65) Prior Publication Data

US 2011/0120781 A1 May 26, 2011

Related U.S. Application Data

(60) Provisional application No. 61/262,473, filed on Nov. 18, 2009.

(51) Int. Cl.
| | |
|---|---|
| E21B 10/36 | (2006.01) |
| E21B 10/46 | (2006.01) |
| B29C 43/00 | (2006.01) |
| E21B 10/573 | (2006.01) |
| C22C 1/10 | (2006.01) |
| B22F 5/00 | (2006.01) |
| B29K 503/04 | (2006.01) |

(52) U.S. Cl.
CPC .............. *E21B 10/573* (2013.01); *E21B 10/46* (2013.01); *B22F 2005/001* (2013.01); *B29K 2503/04* (2013.01); *B29C 43/003* (2013.01); *C22C 1/1068* (2013.01)
USPC ............ 175/425; 175/374; 175/377; 175/433

(58) Field of Classification Search
None
See application file for complete search history.

(56) References Cited

U.S. PATENT DOCUMENTS

| | | | |
|---|---|---|---|
| 5,011,514 A * | 4/1991 | Cho et al. .................. | 51/295 |
| 5,733,664 A | 3/1998 | Kelley et al. | |
| 6,095,265 A * | 8/2000 | Alsup .......................... | 175/379 |
| 6,248,149 B1 * | 6/2001 | Massey et al. ............. | 75/236 |
| 6,287,360 B1 | 9/2001 | Kembaiyan et al. | |
| 6,372,346 B1 * | 4/2002 | Toth .......................... | 428/403 |
| 6,908,688 B1 * | 6/2005 | Majagi et al. ............. | 428/552 |
| 7,474,341 B2 | 1/2009 | DeLuca et al. | |
| 8,342,268 B2 * | 1/2013 | Lockstedt et al. ......... | 175/374 |
| 2005/0275143 A1 | 12/2005 | Toth | |
| 2006/0162967 A1 * | 7/2006 | Brackin et al. ............ | 175/374 |
| 2007/0102198 A1 * | 5/2007 | Oxford et al. ............. | 175/374 |
| 2008/0164070 A1 | 7/2008 | Keshavan et al. | |
| 2009/0260893 A1 | 10/2009 | Sheng et al. | |
| 2009/0283333 A1 | 11/2009 | Lockwood et al. | |
| 2010/0116557 A1 | 5/2010 | Lockwood et al. | |

OTHER PUBLICATIONS

Levy, S., Construction Calculations Manual, 2012, Elsevier, Inc., p. 65-66.*

* cited by examiner

*Primary Examiner* — Jennifer H Gay
*Assistant Examiner* — Caroline Butcher
(74) *Attorney, Agent, or Firm* — Osha Liang LLP

(57) ABSTRACT

A drill bit may include a bit body having a plurality of blades extending radially therefrom and at least one cutting element for engaging a formation disposed on at least one of the plurality of blades. The bit body has a continuous infiltration binder and a plurality of carbide particles dispersed in the continuous infiltration binder, wherein at least a portion of the plurality of carbide particles and at least a portion of the continuous infiltration binder form a first carbide matrix region, and wherein the plurality of carbide particles forming the first carbide matrix region have an average grain sizes of less than about 44 microns.

36 Claims, 10 Drawing Sheets

HIGH STRENGTH INFILTRATED MATRIX BODY USING FINE GRAIN DISPERSIONS

CROSS-REFERENCE TO RELATED APPLICATIONS

Pursuant to 35 U.S.C. §119(e), this application claims priority to U.S. Provisional Application 61/262,473, filed on Nov. 18, 2009, which is herein incorporated by reference in its entirety.

BACKGROUND OF INVENTION

1. Field of the Invention

Embodiments disclosed herein relate generally to matrix body drill bits and the methods for the manufacture of such drill bits. In particular, embodiments disclosed herein relate generally to use of fine grain carbide particles to form a bit body.

2. Background Art

Various types and shapes of earth boring bits are used in various applications in the earth drilling industry. Earth boring bits have bit bodies which include various features such as a core, blades, and pockets that extend into the bit body or roller cones mounted on a bit body, for example. Depending on the application/formation to be drilled, the appropriate type of drill bit may be selected based on the cutting action type for the bit and its appropriateness for use in the particular formation. In PDC bits, polycrystalline diamond compact (PDC) cutters are received within the bit body pockets and are typically bonded to the bit body by brazing to the inner surfaces of the pockets. The PDC cutters are positioned along the leading edges of the bit body blades so that as the bit body is rotated, the PDC cutters engage and drill the earth formation. In use, high forces may be exerted on the PDC cutters, particularly in the forward-to-rear direction. Additionally, the bit and the PDC cutters may be subjected to substantial abrasive forces. In some instances, impact, vibration, and erosive forces have caused drill bit failure due to loss of one or more cutters, or due to breakage of the blades.

Bit bodies are typically made either from steel or from a tungsten carbide matrix bonded to a separately formed reinforcing core made of steel. While steel body bits may have toughness and ductility properties which make them resistant to cracking and failure due to impact forces generated during drilling, steel is more susceptible to erosive wear caused by high-velocity drilling fluids and formation fluids which carry abrasive particles, such as sand, rock cuttings, and the like. Generally, steel body PDC bits are coated with a more erosion-resistant material, such as tungsten carbide, to improve their erosion resistance. However, tungsten carbide and other erosion-resistant materials are relatively brittle. During use, a thin coating of the erosion-resistant material may crack, peel off or wear, exposing the softer steel body which is then rapidly eroded. This can lead to loss of PDC cutters as the area around the cutter is eroded away, causing the bit to fail.

Tungsten carbide or other hard metal matrix body bits have the advantage of higher wear and erosion resistance as compared to steel bit bodies. The matrix bit generally is formed by packing a graphite mold with tungsten carbide powder and then infiltrating the powder with a molten copper-based alloy binder. The matrix powder may be a powder of a single matrix material such as tungsten carbide, or it may be a mixture of more than one matrix material such as different forms of tungsten carbide. There are several types of tungsten carbide that have been used in forming matrix bodies, including macrocrystalline tungsten carbide, cast tungsten carbide, carburized (or agglomerated) tungsten carbide, and cemented tungsten carbide.

The matrix powder may include further components such as metal additives. Metallic binder material is then typically placed over the matrix powder. The components within the mold are then heated in a furnace to the flow or infiltration temperature of the binder material at which the melted binder material infiltrates the tungsten carbide or other matrix material. The infiltration process that occurs during sintering (heating) bonds the grains of matrix material to each other and to the other components to form a solid bit body that is relatively homogenous throughout. The sintering process also causes the matrix material to bond to other structures that it contacts, such as a metallic blank which may be suspended within the mold to produce the aforementioned reinforcing member. After formation of the bit body, a protruding section of the metallic blank may be welded to a second component called an upper section. The upper section typically has a tapered portion that is threaded onto a drilling string. The bit body typically includes blades which support the PDC cutters which, in turn, perform the cutting operation. The PDC cutters are bonded to the body in pockets in the blades, which are cavities formed in the bit for receiving the cutting elements.

The matrix material or materials determine the mechanical properties of the bit body (in addition to being partly affected by the binder material used). These mechanical properties include, but are not limited to, transverse rupture strength (TRS), toughness (resistance to impact-type fracture), hardness, wear and abrasion resistance, erosion resistance (resistance to erosion from rapidly flowing drilling fluid), steel bond strength between the matrix material and steel reinforcing elements, such as a steel blank, and strength of the bond to the cutting elements, i.e., braze strength, between the finished body material and the PDC cutter.

With the development of thermally stable PDC cutters, bit failure has transitioned from resulting from cutter failure to resulting to bit body failure. Bit bodies formed from either cast or macrocrystalline tungsten carbide or other hard metal matrix materials, while more erosion resistant than steel, often lack toughness and strength (relative to steel), thus making them brittle and prone to cracking when subjected to impact and fatigue forces encountered during drilling. Cracking (and/or formation of micro-cracks) can also occur during the cutter brazing process in the area surrounding the cutter pockets. The formation and propagation of cracks in the matrix body during the drilling process may result in the loss of one or more PDC cutters. A lost cutter may abrade against the bit, causing further accelerated bit damage. However, bits formed with sintered tungsten carbide may have sufficient toughness and strength for a particular application, but may lack other mechanical properties, such as erosion resistance. Thus, previous efforts have instead relied on combinations of materials to achieve a balance of properties. Changing a matrix material to increase wear or erosion resistance usually results in a loss in toughness, or vice-versa.

Accordingly, there exists a continuing need for developments in matrix bit bodies to simultaneously achieve good erosion resistance and strength.

SUMMARY OF INVENTION

In one aspect, embodiments disclosed herein relate to a drill bit that includes a bit body having a plurality of blades extending radially therefrom, the bit body comprising a continuous infiltration binder and a plurality of carbide particles dispersed in the continuous infiltration binder, wherein at least a portion of the plurality of carbide particles and at least a portion of the continuous infiltration binder form a first carbide matrix region, wherein the plurality of carbide particles forming the first carbide matrix region have an average grain sizes of less than about 44 microns; and at least one cutting element for engaging a formation disposed on at least one of the plurality of blades.

In another aspect, embodiments disclosed herein relate to a drill bit that includes a bit body having a plurality of blades extending radially therefrom, the bit body comprising: a continuous infiltration binder phase; and a plurality of carbide particles dispersed in the continuous infiltration binder phase, wherein at least a portion of the plurality of carbide particles form a plurality of carbide concentrate zones and each of the plurality of carbide concentrate zones comprises a plurality of carbide grains; and wherein the continuous infiltration binder phase is a continuous phase surrounding and within plurality of carbide concentrate zones; and at least one cutting element for engaging a formation disposed on at least one of the plurality of blades.

In yet another aspect, embodiments disclosed herein relate to a method of manufacturing a drill bit including a bit body and a plurality of blades extending radially from the bit body that includes loading a matrix powder comprising a plurality of carbide granules into a mold, each carbide granule comprising a plurality of associated carbide grains; heating and infiltrating the matrix powder with a infiltrating binder, wherein the infiltrating comprises to infiltrating the binder through the plurality of associated carbide grains to form the drill bit having the bit body and the plurality of blades.

In yet another aspect, embodiments disclosed herein relate to a drill bit that includes a bit body having a plurality of blades extending radially therefrom, the bit body comprising a continuous infiltration binder and a plurality of carbide particles dispersed in the continuous infiltration binder, wherein at least a portion of the plurality of carbide particles and at least a portion of the continuous infiltration binder form a first carbide matrix region, wherein at least 30 percent of plurality of carbide particles forming the first carbide matrix region have a grain size of less than about 44 microns; and at least one cutting element for engaging a formation disposed on at least one of the plurality of blades.

In yet another aspect, embodiments disclosed herein relate to a drill bit that includes a bit body having a plurality of blades extending radially therefrom, the bit body comprising a continuous infiltration binder phase and a plurality of particles dispersed in the continuous infiltration binder phase, wherein at least a portion of the plurality of particles form a plurality of concentrate zones and wherein the continuous infiltration binder phase is a continuous phase surrounding and within plurality of concentrate zones; and at least one cutting element for engaging a formation disposed on at least one of the plurality of blades.

Other aspects and advantages of the invention will be apparent from the following description and the appended claims.

DETAILED DESCRIPTION

In one aspect, embodiments disclosed herein relate to matrix body drill bits and the methods of manufacturing and using the same. More particularly, embodiments disclosed herein relate to PDC drill bits having tailored material compositions allowing for extension of their use downhole. Even more particularly, embodiments disclosed herein relate to bit bodies formed from fine grain carbides.

Figure 1:
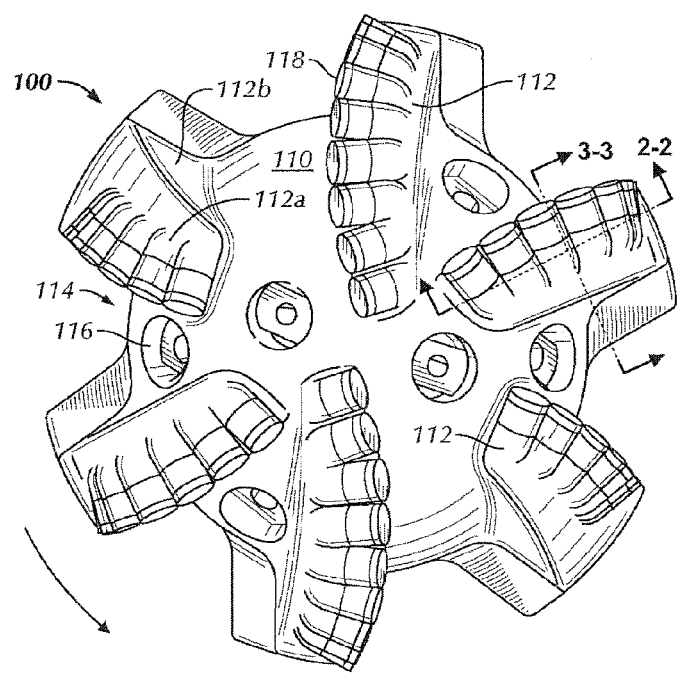
FIG. 1 is a drill bit in accordance with one embodiment.

Referring to FIG. 1, a drill bit in accordance with one embodiment is shown. As shown in FIG. 1, bit 100 includes a bit body 110 and a plurality of blades 112 that are extending from the bit body 110. Blades 112 may extend from a center of the bit body 110 radially outward to the outer diameter of the bit body 110, and then axially downward, to define the diameter (or gage) of the bit 100. A plurality of cutters 118 are received by cutter pockets (not shown separately) formed in blades 112. The blades 112 are separated by flow passages 114 that enable drilling fluid to flow from nozzles or ports 116 to clean and cool the blades 112 and cutters 118.

In a conventional matrix bit, such as formed by infiltrating techniques, a matrix material mixture of hard particles and metal particles are poured into the blade portions (and a portion of the interior bit body), a softer, machinable powder is typically poured on top of the matrix material mixture, and the powder is infiltrated with an infiltration binder. Such powders have a particle size range between 177 to 44 micrometers (−80+325 mesh), typically with a wide particle size distribution. Prior art matrix material mixtures for infiltration have no more than 2 to 8 weight percent of the particles less than 10 micrometers. Particles less than 44 micrometers (−325 mesh), and especially less than 10 micrometers are difficult to infiltrate using prior art methods. Powders of such fine grain may be difficult if not impossible to load into a mold and then infiltrate due to 1) the tendency for such powders to fly through the air when poured; 2) movement and segregation of very fine particles during mold vibration; and 3) the close packing of the particles and difficulty/inability for a molten binder to infiltrate therethrough to the bottom of the mold. Rather, in accordance with the present disclosure such fine grain particles may be associated together to form larger granules, which may allow for loading into the mold as well as the molten binder to infiltrate completely through the matrix powder (including through the fine particles) to the mold bottom. Porosity in the granules may also allow for the binder to infiltrate between the plurality of individual grains. In a particular embodiment, the pre-sintered granules may have an open porosity of at least 5%, and at least 10 or 15% in other embodiments.

Such granules of associated particles or grains may be formed by associating the fine particles together by one of several ways, including: granulation with an organic binder (such as wax, polyvinyl alcohol, polyvinyl butyral, etc.) and optionally a metal powder or by granulation and pre-sintering of particles to form a partially densified agglomerate (with some porosity present). For example, fine particles or grains of carbide may be associated together to form larger carbide granules. The carbide grains may be monotungsten carbides; however, in other embodiments, non-tungsten carbides of vanadium, boron, chromium, titanium, tantalum, niobium, iron, molybdenum, and/or other transition metals may be used. In some embodiments, fine particles or grains made of non-carbide materials, such as CBN, $TiB_2$, or TiN, for example, may be associated together to form larger granules for formation of at least part of a matrix drill bit. Additionally, some embodiments may include fine particles or grains of metal material with a higher melting point than the infiltration melting alloy, such as W, Nb, Mo, Ti, Ni, Fe, or other refractory metals. For example, in embodiments having larger granules made of associated metal particles or grains, the metal granules may provide high toughness in at least a portion of the drill bit, and may be tough enough to replace the traditional solid steel blank.

The individual grains may range in size from less than about 44 microns in one embodiment (down to submicron or nano-size particles), to less than about 20 microns, or from about 0.1 to 10 microns in other various embodiments. In a particular embodiment, the particles may have a grain size ranging from 0.5 to 6 microns. In another embodiment, the particles may be nanoparticles, having a size ranging from less than 0.5 microns, and particularly, from less than 0.1 microns.

Further, fine particles or grains may be thinly coated by chemical vapor deposition (CVD), atomic layer deposition (ALD), or other method known in the art, prior to being associated together to form a larger granule. For example, at least part of a bit body may be formed from larger granules made of associated coated-oxides, such as aluminum oxide or silicon dioxide, coated with a tungsten carbide cermet by CVD. In another example, at least part of a bit body may be formed from larger granules made of associated carbide particles or grains that are individually coated by CVD, for example. In some embodiments, fine particles or grains having an intermediate layer and an outer layer referred to as Tough-Coated Hard Powders (TCHPs, or EternAloy®), such as described in U.S. Application 2005/0275143, may be used to form granules. In particular, TCHPs include a super hard refractory particle CVD coated with nanolayers of WC or TaC (intermediate layer) and Co or Ni binder (outer layer).

The pellets (granules or pre-sintersed agglomerates) may be granulated to an average particle size ranging from about 50 to 1000 microns. However, in embodiments formed of nanoparticles, the granules may be 1 micron or less, and in embodiments formed with conventionally sized particles, the granules may be up to 5000 microns. For example, conventional WC particles may be associated with fine particles, or with other conventionally sized particles, which may provide faster and easier loading in a drill bit mold and faster infiltration rates.

Granulation may occur, for example, by ball milling the fine grain carbides with an organic wax so that the particles associate together or by mixing the particles with an organic binder in a mixer and then extruding the mixture into smaller pieces and then dried. As mentioned above, pre-sintering may optionally occur to melt or soften or fuse at least some of the metal particles together to provide additional strength and cohesiveness to the agglomerates. Pressure may optionally be applied during the pre-sintering to reduce some but not all porosity present in the granules. Pre-sintering to form a partially densified agglomerate may be performed by heating to times and temperatures insufficient to form full density, such as that achieved with a cemented tungsten carbide pellet. Such partial densification may be performed similar to the methods described in U.S. Pat. No. 7,470,341, which is assigned to the present assignee and herein incorporated by reference in its entirety. The granules (optionally pre-sintered) are distinct from sintered or cemented tungsten carbide pellets or crushed particles known in the art. Specifically, such particles have been densified and completely sintered to have no or minimal open porosity, such that when used in a matrix powder, the sintered particles do not substantially change and do not have infiltration binder that infiltrates between the individual carbide grains. Additionally, the continuous infiltration phase is distinct from the metallic phase present in a sintered WC—Co pellet or particle, which is not melted during the infiltration process, and can be seen as a distinct phase when comparing a microstructure of a bit formed with sintered pellets (WC—Co) with a bit formed in accordance with the present disclosure. Further, in one embodiment, the metal content between the plurality of fine carbide particles in accordance with the present disclosure may be at least 20 percent and at least 30 percent in another embodiment, whereas the metal content in sintered pellets may be less than 15 percent. Additionally, there may also be a difference in mean free path between the fine carbides of the present disclosure and sintered pellets, where the mean free path between the fine carbides of the present disclosure may range from 0.5 to 5 microns, while sintered, densified pellets possess a mean free path closer to 0.1.

Optionally, the carbide grains may be granulated with a metal powder, such as cobalt, nickel, iron, chromium, copper, molybdenum, titanium, aluminum, niobium and their alloys, and combinations thereof. In a particular embodiment, the metal powder may be selected based on the melting temperature of the metal, as compared to the infiltration binder. For example, use of a copper metal in the granules may allow for better infiltration of the infiltration binder between the fine grains. When used, the metal powder may be present in an amount up to 20 weight percent of the carbides, and less than 16 or 14 weight percent in various other embodiments. Further, one skilled in the art would appreciate after learning the teachings contained in the present disclosure, that the presence and amount of metal powder may be based, for example, on the desired properties for the matrix body. For example, an increased level of metal powder may result in a material that possesses greater toughness and strength. Therefore, for regions of the bit body where greater toughness and/or strength is desired, metal powder may be desirable and in amounts greater than 10 weight percent. Further, while the metal powder may be used in formulating the granules, it is also within the scope of the present disclosure that metal powder may also be mixed with the carbide granules to form the matrix powder.

The term "infiltration binder" herein refers to a metal or an alloy used in an infiltration process to bond the various particles of tungsten carbide (or in this instance encapsulated particles) forms together. Suitable metals include all transition metals, main group metals and alloys thereof. For example, copper, nickel, iron, and cobalt may be used as the major constituents in the infiltration binder. Other elements, such as aluminum, manganese, chromium, zinc, tin, silicon, silver, boron, and lead, may also be present in the infiltration binder. In one particular embodiment, the infiltration binder is selected from at least one of nickel, copper, and alloys thereof. The infiltrating binder may include, for example, a Cu—Mn—Ni alloy, Cu—Mn—Ni—Zn, Cu—Mn—Ni—Zn—Sn, Ni—Cr—Si—B—Al—C alloy, Ni—Al alloy, Cu—P alloy, Co alloy, and/or Fe alloy.

Figure 5A:
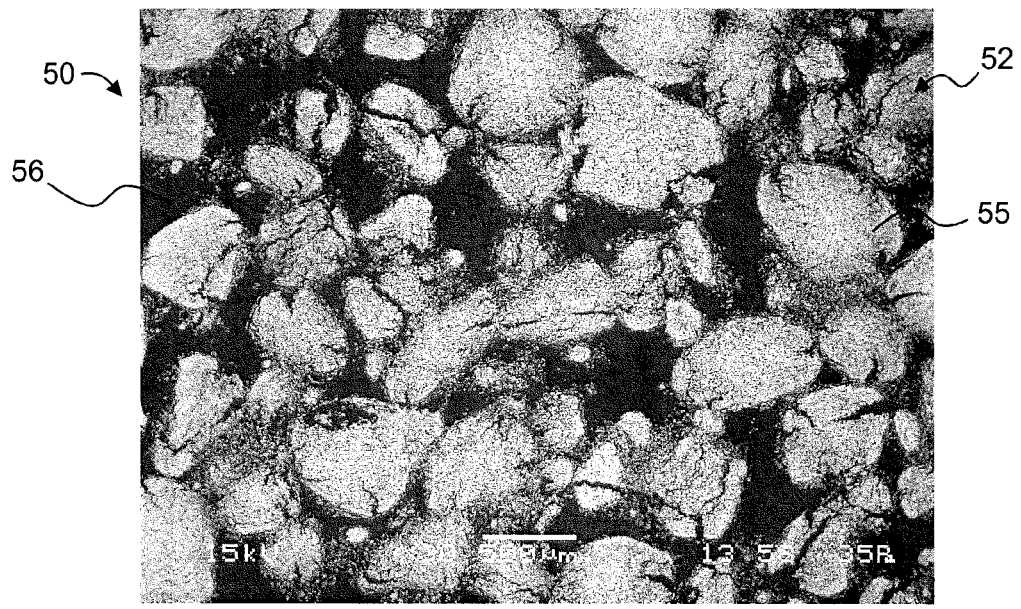
FIG. 5A-C show scanning electron microscope images at 30×, 100× and 1500× magnification of a matrix material according to the present disclosure.
Figure 5B:
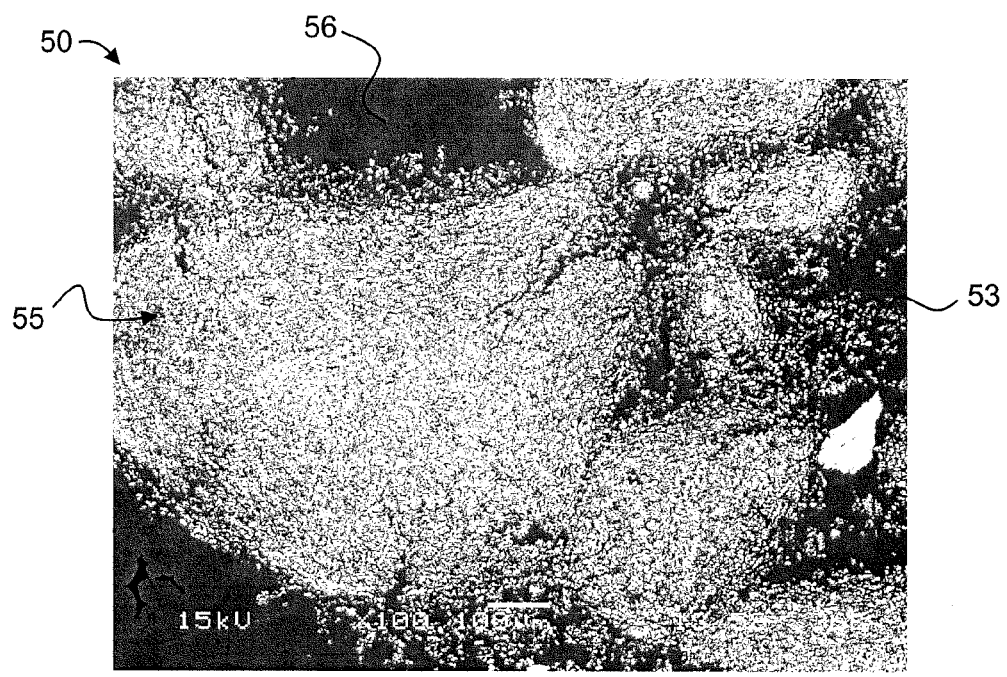
Figure 5C:
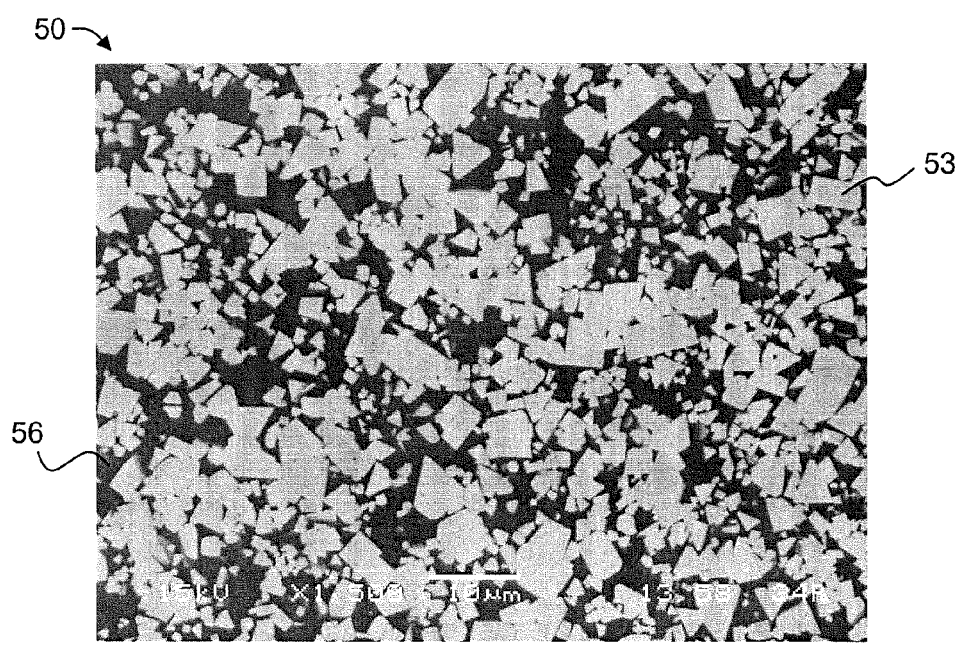

Referring now to FIGS. 5A-C, scanning electron microscope images at three magnifications (30×, 100×, 1500×) of an embodiment of the present disclosure are shown. As shown in FIGS. 5A-C, the matrix body 50 is formed of a carbide phase 52 and a metal matrix or continuous phase 56. The carbide phase 52 is formed from a plurality of fine carbide grains 53 that are associated together as concentrated carbide zones 55. During the infiltration of the matrix powder, the metallic infiltration binder may infiltrate into the granules of associated carbide grains so that a continuous metal matrix phase 56 may be present surrounding the concentrated carbide zones 55 and as well as within the concentrated carbide zones 55. The presence of the concentrated carbide zones 55 is reflective of the carbide distribution through the matrix body. Further, carbide distribution may be discussed in terms of the mean free path, which represents the mean distance between carbide particles. Thus, for carbide particles within a concentrated carbide zone, the particles may have a first average mean free path, such as from about 0.5 to 5 microns. However, between adjacent concentrated zones (or between carbide particles of adjacent concentrated zones), there may be a second average mean free path, greater than the first, such as from about 5 to 500 microns between adjacent concentrated zones. In a particular embodiment, the average mean free path between concentrated zones may be at least 5 or 10 times that average mean free path within the concentrated carbide zone.

Also, optionally, the granules or agglomerates of fine grain carbides may be used in combination with various other types of carbides, used as conventional matrix powder materials for matrix bit bodies. For example, the matrix powder material may include at least one of macrocrystalline tungsten carbide particles, carburized tungsten carbide particles, cast tungsten carbide particles, and sintered tungsten carbide particles, as well as non-tungsten carbides such as those described above. In a particular embodiment, the matrix powder material may include at least one of macrocrystalline carbide or cast carbide. When used in a homogenous mixture, there may be a clear bi- or otherwise multi-modal distribution of particle sizes, with the lower "mode" of the distribution having an average grain size of less than 44 microns. According to some embodiments, a concentrate zone may include bi-modal or otherwise multi-modal type distribution of particle sizes to provide a higher particle packing than in embodiments with concentrate zones having a mono-modal type distribution of particles sizes. In another embodiment, the matrix powder may be formed from at least 30 weight percent of the fine grain carbides, with the balance being larger carbides. Such larger carbides may have an average particle size of at least 150 microns, at least 200 microns, or at least 500 microns. Thus, the fine grain carbide granules of the present disclosure may be combined with another carbide particle to form a substantially homogenous mixture or the conventional matrix materials may be used as a separate matrix powder, loaded separately into a mold from the fine grain carbide granules. Use of multiple powers may allow for multiple carbide regions to be formed, whereby a cross-sectional analysis of the matrix body would reveal two distinct microstructures based on the differences in the matrix powder compositions.

As discussed above, the properties of the fine grain matrix materials may be altered by varying the chemical make-up of the matrix powder material, such as by altering the percentages/ratios of the amount of hard particles as compared to binder powder. Thus, by decreasing the amount of tungsten carbide particle and increasing the amount of binder powder in a portion of the bit body, a softer portion of the bit body may be obtained, and vice versa. Additionally, carbide grain sizes may also be varied to achieve a desired result. Further, in addition to selecting the fine grain carbide composition to have the desired properties, other conventional tungsten carbide types may be incorporated with the fine grain granules in the same or different powder of the present disclosure. Specifically, the type of conventional matrix materials, i.e., the types and relative amounts and sizes of tungsten carbide, for example, may be selected based on the type and location of their use in a mold, so that the various bit body portions have the desired erosion resistance and/or strength for the given location.

Use of multiple matrix materials may be used so that particular regions of a matrix body may be formed to have concentrated zones of fine carbides in a first region, a different material composition in a second region, and yet a different material composition in a third region, etc., or the remaining portions of the bit body. Further, in addition to or instead of concentrated zones of just carbide particles, it is also within the scope of the present disclosure that concentrate zones may be formed of only fine particles different than carbide. In yet another embodiment, concentrate zones may be formed of a mixture of fine carbide particles and fine particles different than carbide. By using fine particles made of materials different from carbides to form concentrate zones, an optimal blend of properties may be designed for various regions of a drill bit.

Examples of such regions which may be formed of such fine grain materials include any outer surface of the bit or surrounding any bit components, including blade tops, sidewalls, bit body exterior, regions surrounding cutters, as part of the cutter pocket, regions surrounding nozzles or ports, etc. In another exemplary embodiment, concentrate zones formed only of metal fine grain materials may form the steel blank region of a drill bit. However, there is no limitation on the number or types of regions of the bit body which may be formed of such materials.

Embodiments of the present disclosure formed of fine particles or grains ranging in size from less than 44 microns, for example, may have concentrate zones ranging in size from about 50 to 1000 microns. However, in embodiments having fine particles that are nanometer-sized, concentrate zones may range in size from 1 micron or less. In embodiments having concentrate zones made of larger particles, such as with an average particle size of 150 microns or greater, the concentrate zones may range in size from up to 5000 microns. Further, drill bits of the present disclosure may have a mono-modal, bi-modal, or otherwise multi-modal distribution in size of concentrate zones. Advantageously, embodiments having bi-modal or multi-modal type distribution in the size of concentrate zones may have increased packing density when forming the drill bit in a mold.

Methods of making matrix bit bodies are known in the art and are disclosed for example in U.S. Pat. No. 6,287,360, which is assigned to the assignee of the present invention. These patents are hereby incorporated by reference. Briefly, infiltration processes that may be used to form a matrix bit body of the present disclosure may begin with the fabrication of a mold, having the desired body shape and component configuration. Matrix powder having the fine carbide particles of the present disclosure may be loaded into the mold in the desired location, i.e., blades, and the mass of particles may be infiltrated with a molten infiltration binder and cooled to form a bit body. Alternatively, a second matrix powder may be loaded first or alternatively onto the first matrix powder, such that a bit body (or blade, as shown in FIG. 2) may be generally divided into two matrix regions: a first matrix region 220 formed with fine carbide particles and a second matrix region 224 formed from any powder.

Figure 2:
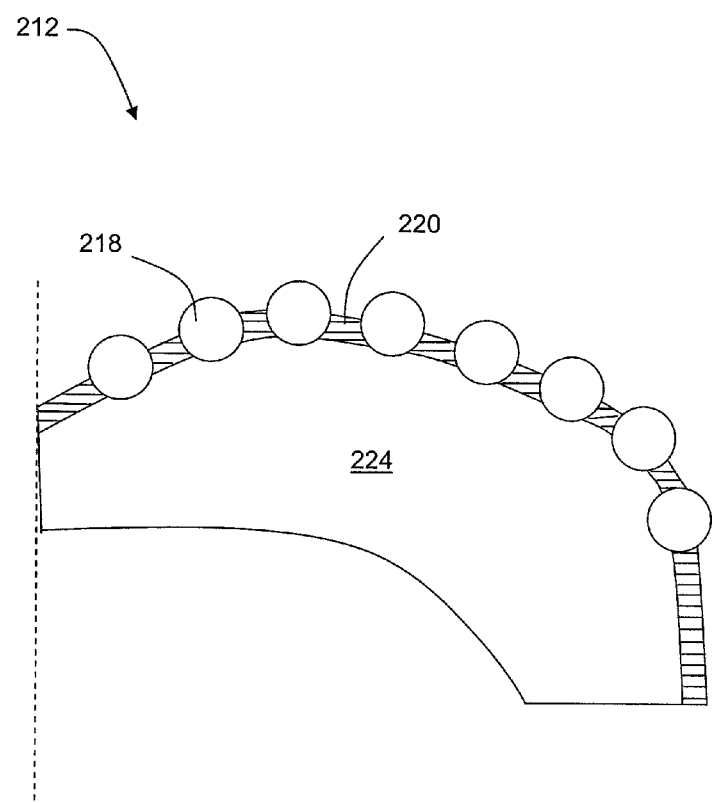
FIG. 2 shows a cross-sectional view of a blade along 2-2 of the bit of FIG. 1.

Specifically, as shown in FIG. 2, the upper surface of blade 212 (or blade top 112a shown in FIG. 1) may form a first matrix region 220 (which interposes cutters 218 as shown in this cross-sectional view), whereas the inner core of the blade 212 forms a second matrix region 224. In such an embodiment, it may be desirable to apply a matrix material for the first matrix region 220 to have greater hardness/wear and erosion resistance as compared to second matrix region 224, where toughness is desired. While toughness and strength are desirable for durability, a wear/erosion resistant exterior is desirable to prevent premature wear and erosion of the bit body material, especially on areas surrounding cutters 218. Further, while the first matrix region 230 is illustrated as extending uniformly across the entire blade top 212, the present invention is not so limited. Rather, first matrix region 220 may include any portion of blade top 212, with a uniform thickness or not.

Figure 3A:
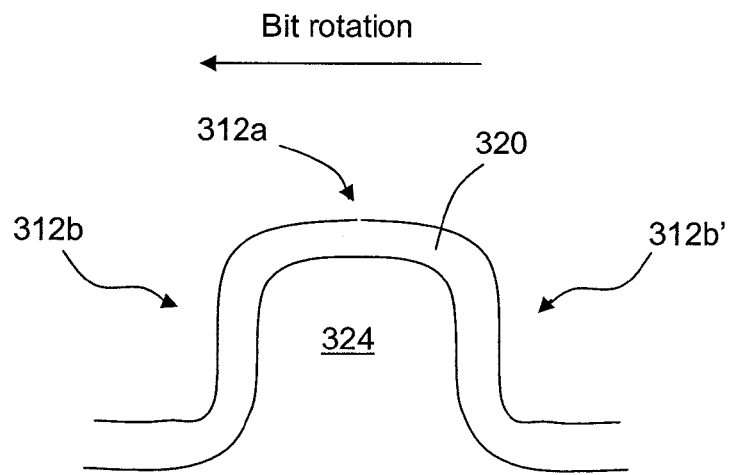
FIGS. 3A-D shows cross-sectional views of various embodiments of a blade along 3-3 of the bit of FIG. 1.
Figure 3B:
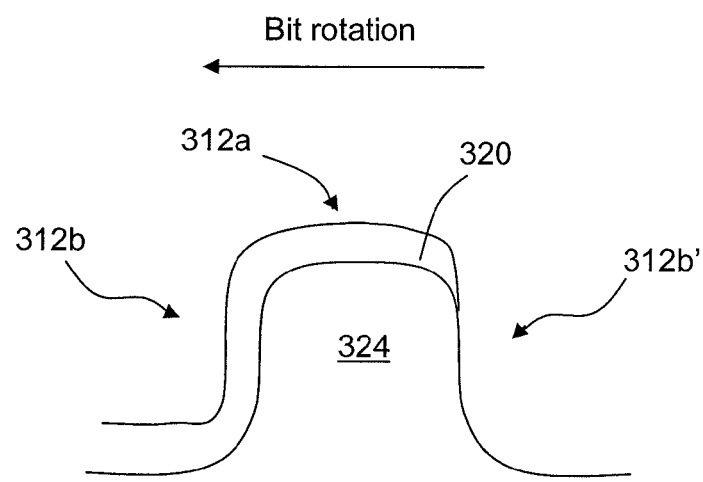
Figure 3C:
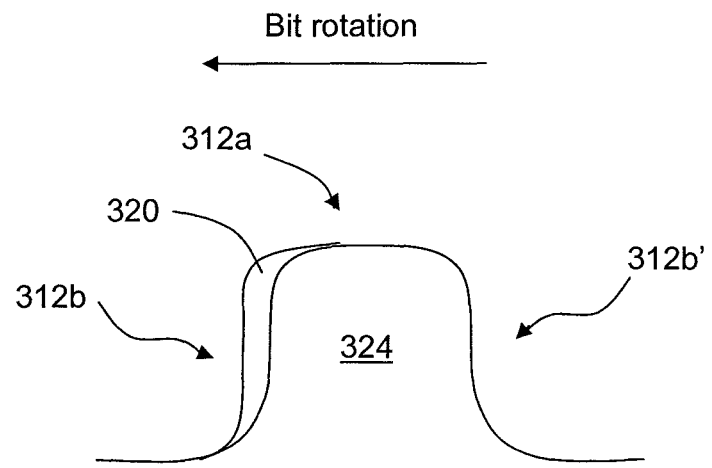
Figure 3D:
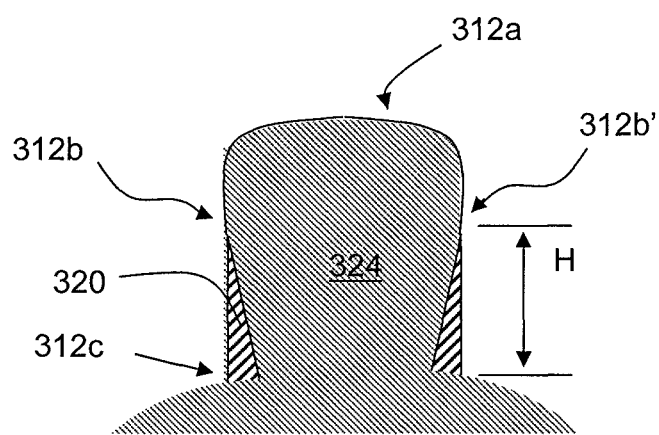

In addition to a first matrix region being along a blade top (112a in FIG. 1), as shown in FIGS. 3A-D, various embodiments may provide for first matrix region 320 to be placed on at least a portion of blade tops (112a in FIG. 1) and/or blade sidewalls (112b in FIG. 1). Specifically, as shown in FIG. 3A, first matrix region 320 may occupy blade top 312a and both the leading 312b and trailing 312b' sidewalls, which are determined by the direction in which the bit rotates downhole. One skilled in the art would appreciate that a leading edge 312b or sidewall is the edge of the blade which faces the direction of rotation of the bit, whereas the trailing edge 312b' is the edge of the blade that does not face the direction of rotation of the bit. Within the core or inner region of the blade, for example, adjacent an inner periphery of first matrix region 320 is second matrix region 324. However, other variations may also be within the scope of the present disclosure. For example, as shown in FIG. 3B, first matrix region 320 forms blade top 312a and leading blade sidewall 312b, but second matrix region 324 forms the inner core and leading sidewall 312b' of blade 312. Further, as shown in FIG. 3C, only leading sidewall 312b is formed of first matrix region 320, and blade top and 312a and trailing sidewall 312b'. Additionally, first matrix region forming a blade sidewall need not extend the entire height of a blade. As shown in FIG. 3D, first matrix region extends a selected height H from a base of blade 312c (where blade 312 extends from bit body (not shown separately)) along the leading and trailing sidewalls 312b, 312b'.

The effect of such embodiments is a harder exterior on a tougher supporting material, similar to an applied hardfacing layer, such as disclosed in U.S. patent application Ser. No. 11/650,860, which is assigned to the present assignee and herein incorporated by reference. However, unlike a hardfacing, the layer or matrix region having the greater wear resistance is integrally formed with the remainder of the bit body, sharing common binder material, and thus metallurgically bonding the materials. This may provide for less crack formation in the first matrix region as compared to a hardfacing layer applied to a solid surface. Hardfacing applied by conventional welding techniques tends to have multiple cracks even before drilling commences and will have inherent weaknesses in being separately applied with greater susceptibility to flaking, chipping, etc. Further, as discussed below in greater detail, the methods and materials may also allow for precision/controllability in the layer thickness.

Additionally, while only a single outer matrix region is shown in these embodiments, it is also within the scope of the present disclosure that multiple gradient layers of matrix materials may be used. Thus, for example, first matrix region may be divided into multiple matrix regions to transition from harder to tougher materials to minimize issues concerning strength and integrity as well as formation of stresses within the bit body.

Figure 4A:
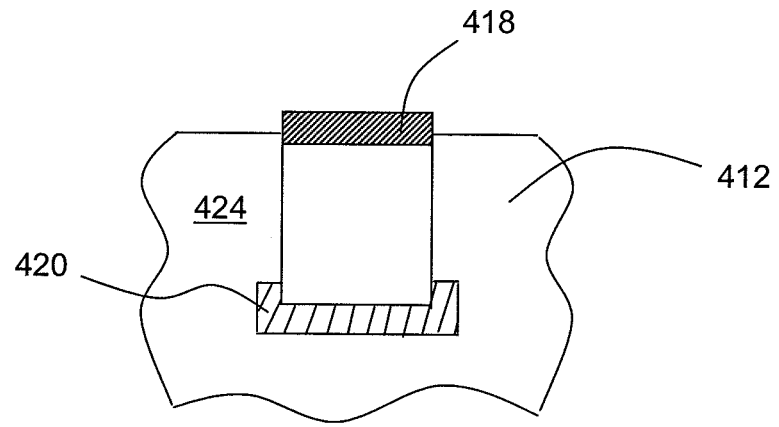
FIGS. 4A-B shows various cross-sectional views of a blade through a cutter.
Figure 4B:
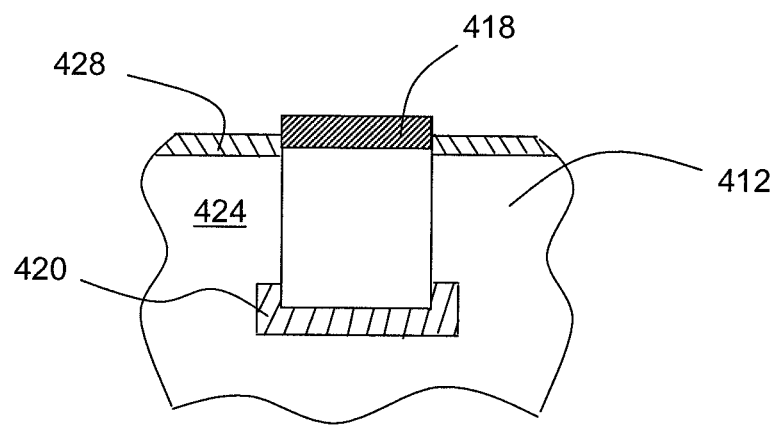

In another embodiment, multiple matrix regions may be used so that at least a portion of the area surrounding cutters may be independently selected for desirable material properties. For example, as shown in FIG. 4A, the base (or non leading face) of cutter 418 is surrounded by a first matrix region 420 unique as compared to second matrix region 420 forming the remainder of blade 412. In a particular embodiment, first matrix region 420 supporting base of cutter 418 may be designed to have a greater toughness than other regions of blade 412, which may be desirable to prevent cracking which frequently occurs behind cutters due to the heavy forces on cutters during drilling. However, one skilled in the art would appreciate that when using the materials of the present disclosure, it may be desirable to use more than two matrix materials. Specifically, as shown in FIG. 4B, first matrix region 420 (formed of a relatively tough material, for example) supports base of cutter 418, while a third matrix region 428 forms at least an outer surface of blade 412, on leading blade sidewall 412b as discussed in FIGS. 3A-D, the remainder of blade 412 being formed of second matrix region 424. Thus, it is clear that by using the materials and methods of the present disclosure, bits having various regions formed of materials specific to the needs of the particular regions may be obtained.

To achieve some of such embodiments, it may be desirable to form the granules of associated fine carbides into a moldable material, similar to that described in U.S. patent application Ser. No. 12/121,575, and U.S. patent application Ser. No. 12/621,402 entitled "Matrix Bit Bodies with Multiple Matrix Materials", both of which are assigned to the present assignee and herein incorporated by reference in their entirety. Alternatively, the fine particles may be incorporated into a moldable material without use of such granules, and the use of the moldable material may also provide for the infiltration of fine carbides generally not achievable when provided as a poured powder. Use of such moldable materials (with or without granulation) may allow for strategic placement of the granules of fine grained carbides in a strategic manner, including along a curved surface of the bit with a uniform thickness of material, in a vertically oriented portions of the bit (when formed in a mold) including blade sidewall, or around a cutter pocket. When such moldable materials are used, the moldable materials may be adhered to any mold surface prior to loading a matrix powder and infiltrating the bit, as described above.

Figure 6:
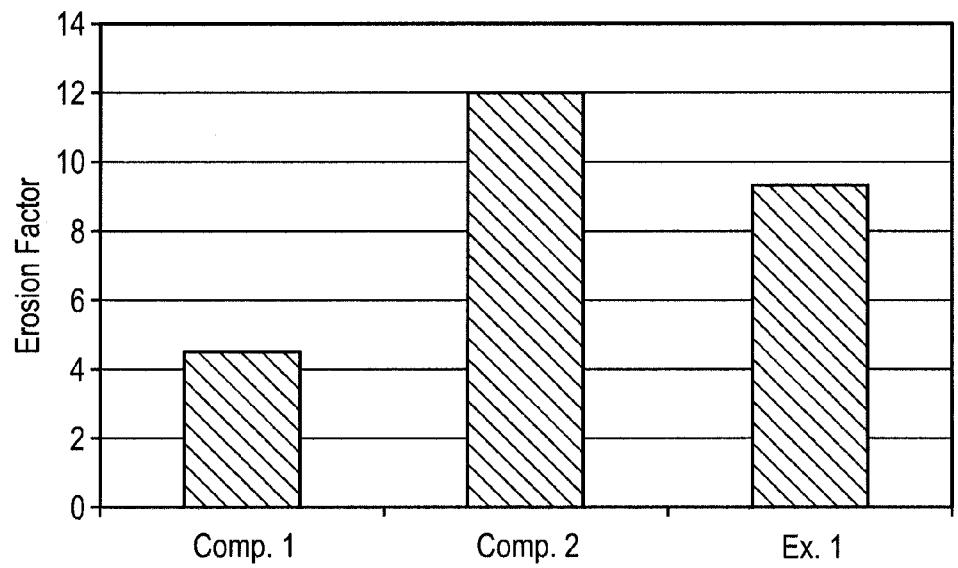
FIG. 6 shows the results of a comparative erosion resistance test.
Figure 7:
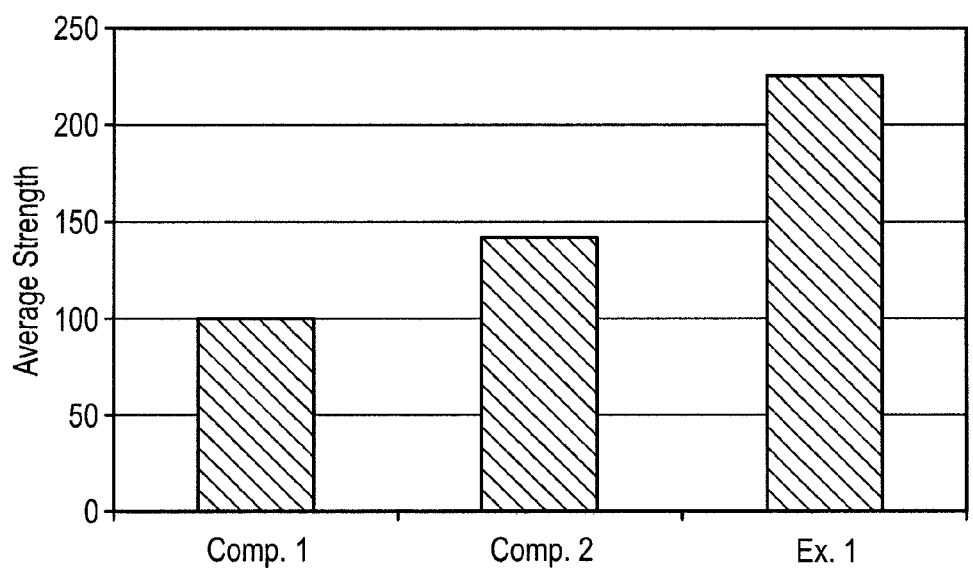
FIG. 7 shows the results of a comparative transverse rupture strength test.

Advantageously, matrix bodies formed with the fine grain carbides of the present disclosure may possess superior strength and crack resistance and possess moderate erosion resistance, particularly for the strength values obtained. For example, referring to FIGS. 6 and 7, erosion resistance and transverse rupture strength of an exemplary embodiment of the present disclosure is compared to two comparative samples.

Tests for transverse rupture strength were conducted according to a procedure based on ASTM B528 where a cylindrical pin of the infiltrated material (diameter of 0.5 inches) was placed in a fixture. A three-point bending load (with a span of 2.5 inches) then was exerted on the pin until failure. The transverse rupture strength was then calculated based upon the actual load to failure and the dimension of the pin specimen (TRS=(load×Span)/($\pi \times r^3$)).

Tests for erosion resistance were conducted by Kennametal (Fallon, Nev.), following ASTM G76. A 1.5 inch diameter "coin" of 0.25 inches thick was used as the specimen size. The erosion factor is the normalized erosion rate based on the specimen volume loss, with a lower factor number having better erosion resistance. Samples were eroded with an abrasive (sand of size 50 to 70 mesh mixed in water) at 70° impingement angle, propelled at 300 feet/second, for a duration of 10 minutes. The specimens were dried, cleaned, weighed, and calculated volume loss (from known density and weight loss)).

Example 1 was formed by agglomerated and presintering tungsten carbide powder having a particle size range of 0.5 to 5 microns with average near 2 microns. Cobalt powder was mixed with the tungsten carbide powder at 12 weight percent of the carbide. The pre-sintered agglomerates ranged in size from 25 to 80 mesh (177-707 microns). The agglomerates were loaded into a mold and infiltrated. Example 1 was compared to matrix samples formed in accordance with U.S. Patent Publication No. 2009/0260893 (Comp. 1) and U.S. Pat. No. 6,287,360 (Comp. 2). This composition (Example 1) showed the best combination of strength and erosion resistance of any matrix tested (see FIGS. 6 and 7).

Figure 8A:
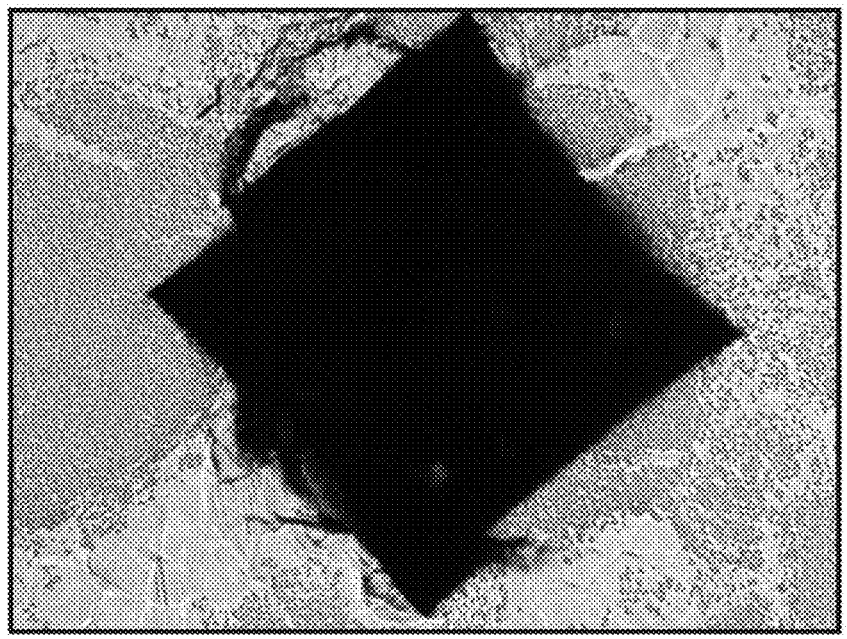
FIGS. 8A-B shows the results of a Palqvist indentation into a matrix material according to the present disclosure.
Figure 8B:
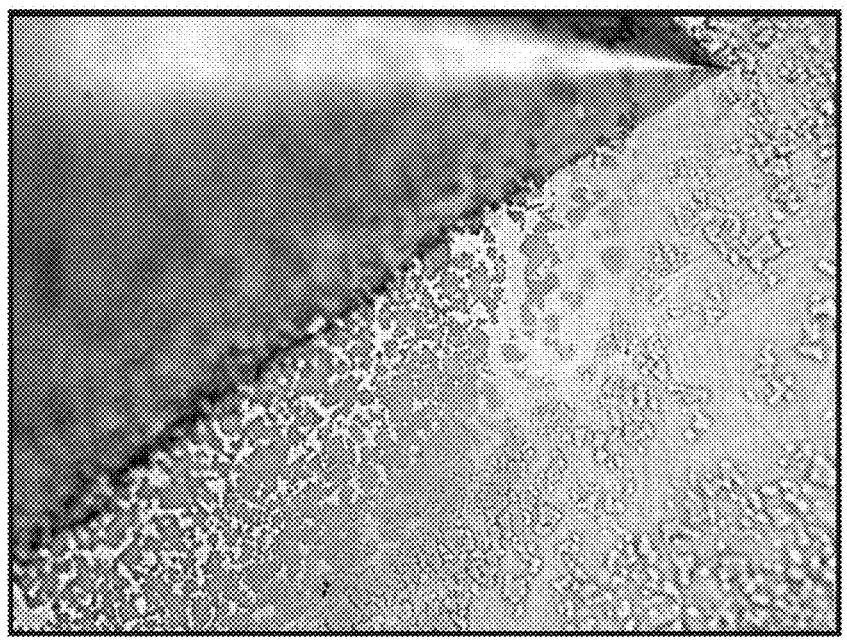
Figure 9:
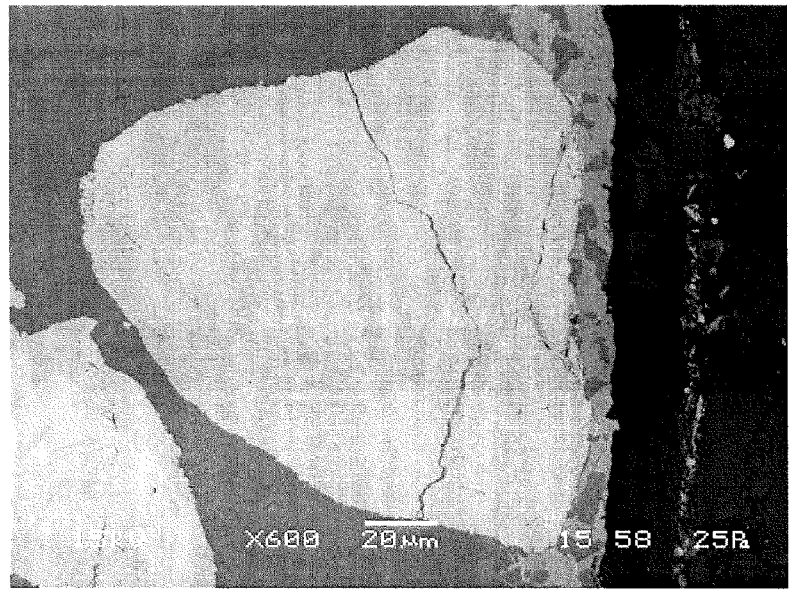
FIG. 9 shows a scanning electron microscope images at 600× magnification of a matrix material at a braze joint for a prior art matrix material.
Figure 10:
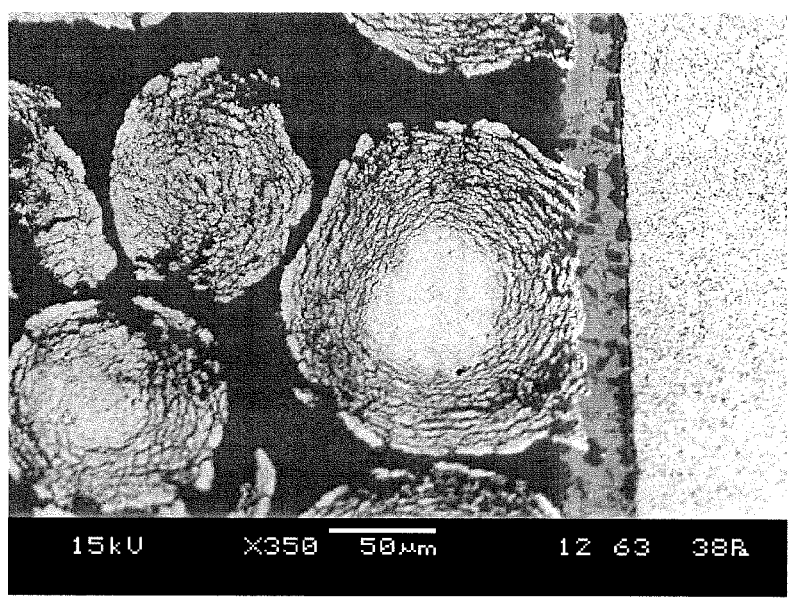
FIG. 10 shows a scanning electron microscope images at 350× magnification of a matrix material at a braze according to the present disclosure.

A Palmqvist toughness test was also performed on the example material to determine the susceptibility to cracking. Generally, the Pamqvist toughness is a toughness value obtained from measuring crack lengths at the corners of a Vickers hardness indentation. For example, a Vickers hardness indentation is first made in a composite material using an applied load P, such as a 150 kgf for tougher grades, and the lengths of the cracks which extend from each corner of the indentation are measured. However, under the applied loads, while the indention was made into the example material, as shown in FIGS. 8A-B, no cracks extending from the corners of the indentation were formed. The lack of cracks in the matrix sample stands in stark contrast to other matrix materials having less strength and which are more crack-prone. In particular, the use of the fine carbide particles instead of the more conventional particles that are coarser results in a material that is less susceptible to micro-cracking. In particular, the carbide grains are so fine that the particles themselves are resistant to cracking. Additionally, there is also sufficient amounts of metal surrounding the fine carbides to also minimize cracking. The crack resistance of the fine carbides may make the materials particularly suitable for use in a matrix body in regions adjacent the cutter pocket. Generally, when a cutter is brazed in a cutter pocket, the heat fluctuations result in micro-cracks in the carbide particles along a line parallel to the braze joint, as shown in FIG. 9. Such small micro-cracks can then grow into larger cracks upon use. Conversely, when a matrix powder with fine carbides are used, as in the present disclosure, such micro-cracks during brazing may be avoided, resulting in a bit with less susceptibility for failure being put into the field, as shown in FIG. 10, for example. Such strength may also be desirable at the base of the blade, as described above. Additionally, as shown, the material also possesses adequate erosion resistance, allowing for its use along a blade surface, including blade tops and/or sidewalls.

The matrix body material in accordance with embodiments of the invention has many applications. Generally, the matrix body material may be used to fabricate the body for any earth-boring bit which holds a cutter or a cutting element in place. Earth-boring bits that may be formed from the matrix bodies disclosed herein include PDC drag bits, diamond coring bits, impregnated diamond bits, etc. These earth-boring bits may be used to drill a wellbore by contacting the bits with an earthen formation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A drill bit, comprising:
a bit body having a plurality of blades extending radially therefrom, the bit body comprising a continuous infiltration binder and a plurality of carbide particles dispersed in the continuous infiltration binder;
wherein at least a portion of the plurality of carbide particles and at least a portion of the continuous infiltration binder form a first carbide matrix region, wherein the plurality of carbide particles forming the first carbide matrix region have an average grain sizes of less than about 44 microns and comprise a mean free path therebetween ranging from 0.5 to 5 microns; and
at least one cutting element for engaging a formation disposed on at least one of the plurality of blades.

2. The drill bit of claim 1, wherein the plurality of carbide particles forming the first carbide matrix region have an average grain size ranging from about 1 to 20 microns.

3. The drill bit of claim 1, wherein the plurality of carbide particles forming the first carbide matrix region have an average grain size of less than about 10 microns.

4. The drill bit of claim 1, wherein the plurality of carbide particles forming the first carbide matrix region have an average grain size ranging from about 0.5 to 6 microns.

5. The drill bit of claim 1, wherein the plurality of carbide particles have an average grain size ranging from 1 micron or less.

6. The drill bit of claim 1, wherein the first matrix region occupies at least a portion of at least one a blade sidewall or cutter pocket.

7. The drill bit of claim 1, wherein the first matrix region occupies at least a portion of a blade surface.

8. The drill bit of claim 1, wherein at least a portion of the plurality of carbide particles and at least a portion of the continuous infiltration binder form a second carbide matrix region, wherein the first carbide matrix region and second carbide matrix region differ in hardness and toughness.

9. The drill bit of claim 1, wherein the continuous infiltration binder separates each of the plurality of carbide particles from each other.

10. The drill bit of claim 1, wherein the first carbide matrix region comprises a plurality of carbide concentrate zones distributed throughout the first carbide matrix region, each of the plurality of carbide concentrate zones comprising the plurality of carbide grains having average grain sizes of less than about 44 microns.

11. The drill bit of claim 10, wherein the plurality of carbide grains in each carbide concentrate zone comprise a first average mean free path therebetween.

12. The drill bit of claim 10, wherein the plurality of carbide concentrate zones comprise a second average mean free path therebetween.

13. The drill bit of claim 10, wherein the continuous infiltration binder surrounds each of the plurality of carbide particles forming the plurality of carbide concentrate zones.

14. The drill bit of claim 10, wherein the plurality of carbide concentrate zones have an average size ranging from about 50 to 1000 microns.

15. The drill bit of claim 10, wherein the plurality of concentrate zones have an average size ranging from 1 micron or less.

16. The drill bit of claim 1, wherein at least a portion of the carbide particles are coated.

17. The drill bit of claim 16, wherein the coated carbide particles are tough-coated hard powders.

18. The drill bit of claim 1, further comprising a plurality of non-carbide particles.

19. The drill bit of claim 18, wherein at least a portion of the non-carbide particles form a plurality of non-carbide concentrate zones distributed throughout the first carbide matrix region.

20. The drill bit of claim 18, wherein the first carbide matrix region comprises a plurality of concentrate zones distributed throughout the first carbide matrix region, each of the plurality of carbide concentrate zones comprising a plurality of the carbide particles and a plurality of the non-carbide particles.

21. A drill bit, comprising:
a bit body having a plurality of blades extending radially therefrom, the bit body comprising:
a continuous infiltration binder phase; and
a plurality of carbide particles dispersed in the continuous infiltration binder phase to form a first carbide matrix region;
wherein at least a portion of the plurality of carbide particles form a plurality of carbide concentrate zones distributed throughout the first carbide matrix region, and each of the plurality of carbide concentrate zones comprises a plurality of carbide grains; and
wherein the continuous infiltration binder phase is a continuous phase surrounding and within the plurality of carbide concentrate zones; and
at least one cutting element for engaging a formation disposed on at least one of the plurality of blades.

22. The drill bit of claim 21, wherein at least a portion of the plurality of carbide particles comprise particles not forming the plurality of carbide concentrate zones.

23. The drill bit of claim 22, wherein the plurality of particles not forming the plurality of carbide concentrate zones are selected from at least one member of the group consisting of cast carbide or macrocrystalline carbide.

24. The drill bit of claim 21, wherein the plurality of carbide grains forming the plurality of carbide concentrate zones comprise average grain sizes of less than about 44 microns.

25. The drill bit of claim 24, wherein the plurality of carbide grains forming the plurality of carbide concentrate zones comprise average grain sizes ranging from about 1 to 20 microns.

26. The drill bit of claim 24, wherein the plurality of carbide grains forming the plurality of carbide concentrate zones comprise average grain sizes of less than about 10 microns.

27. The drill bit of claim 21, wherein the plurality of carbide grains in each carbide concentrate zone comprise a first average mean free path therebetween.

28. The drill bit of claim 27, wherein the plurality of carbide concentrate zones comprise a second average mean free path therebetween that is greater than the first average mean free path.

29. The drill bit of claim 21, wherein the plurality of carbide concentrate zones range in size from 50 to 1000 microns.

30. The drill bit of claim 21, wherein the plurality of concentrate zones have an average size ranging from up to 5000 microns.

31. The drill bit of claim 21, wherein the plurality of concentrate zones have an average size ranging from 1 micron or less.

32. A drill bit, comprising:
a bit body having a plurality of blades extending radially therefrom, the bit body comprising:
a continuous infiltration binder phase; and
a plurality of particles dispersed in the continuous infiltration binder phase,
wherein at least a portion of the plurality of particles form a plurality of concentrate zones;
wherein the plurality of particles in each concentrate zone comprise a first average mean free path therebetween, and the plurality of concentrate zones comprise a second average mean free path therebetween that is larger than the first mean free path; and
wherein the continuous infiltration binder phase is a continuous phase surrounding and within plurality of concentrate zones; and
at least one cutting element for engaging a formation disposed on at least one of the plurality of blades.

33. The drill bit of claim 32, wherein the particles are selected from at least one member of the group consisting of CBN, TiB2, TiN, and an oxide.

34. The drill bit of claim 32, wherein at least a portion of the particles are coated.

35. The drill bit of claim 34, wherein the coating comprises a tungsten carbide cermet.

36. The drill bit of claim 32, wherein the particles are a metal that has a higher melting point than the infiltration binder phase material.

* * * * *